(12) United States Patent
Obersteiner et al.

(10) Patent No.: US 10,470,613 B2
(45) Date of Patent: Nov. 12, 2019

(54) DEVICE FOR CUTTING FOOD

(71) Applicant: KONINKLIJKE PHILIPS N.V., Eindhoven (NL)

(72) Inventors: Heimo Obersteiner, Eindhoven (NL); Johann Nikolaus Unteregger, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 66 days.

(21) Appl. No.: 15/520,187

(22) PCT Filed: Oct. 1, 2015

(86) PCT No.: PCT/EP2015/072722
§ 371 (c)(1),
(2) Date: Apr. 19, 2017

(87) PCT Pub. No.: WO2016/066367
PCT Pub. Date: May 6, 2016

(65) Prior Publication Data
US 2017/0311761 A1 Nov. 2, 2017

(30) Foreign Application Priority Data

Oct. 27, 2014 (EP) .................................... 14190485

(51) Int. Cl.
*A47J 43/046* (2006.01)
*A47J 43/07* (2006.01)
(Continued)

(52) U.S. Cl.
CPC ......... *A47J 43/046* (2013.01); *A47J 43/0716* (2013.01); *B26D 1/29* (2013.01);
(Continued)

(58) Field of Classification Search
CPC ...... A47J 43/046; A47J 43/04; A47J 43/0465; A47J 43/06; A47J 43/07; A47J 43/0716;
(Continued)

(56) References Cited

U.S. PATENT DOCUMENTS 3,392,768 A * 7/1968 Anliker ................. A47J 43/046
83/113
4,076,180 A * 2/1978 Liu ......................... B02C 18/10
241/154

(Continued)

FOREIGN PATENT DOCUMENTS

CN 201101449 Y 8/2008
DE 19902392 A1 * 8/2000 .......... A47J 43/0722

(Continued)

*Primary Examiner* — Evan H MacFarlane

(57) ABSTRACT

A device (1) for cutting food includes a cutting unit having a rotatable carrier, a slicing knife associated with the carrier at one side of the carrier for slicing the food, and at least one dicing knife associated with the carrier at another side of the carrier for dicing the food. The cutting unit also includes a protection element that is disposed along a side of the carrier where the at least one dicing knife associated with the carrier is present. The protection element delimits a dicing space for the at least one dicing knife associated with the carrier to move through during operation. The protection element has at least one annular groove at a side for facing the carrier. The annular groove receives a free end of the at least one dicing knife associated with the carrier.

13 Claims, 7 Drawing Sheets

(51) Int. Cl.
*B26D 3/22* (2006.01)
*B26D 1/29* (2006.01)
*B26D 3/26* (2006.01)
*B26D 5/08* (2006.01)
*B26D 5/10* (2006.01)
*B26D 7/06* (2006.01)
*B26D 7/26* (2006.01)
*B26D 7/00* (2006.01)

(52) U.S. Cl.
CPC ............... *B26D 3/22* (2013.01); *B26D 3/26* (2013.01); *B26D 5/086* (2013.01); *B26D 5/10* (2013.01); *B26D 7/0641* (2013.01); *B26D 7/2628* (2013.01); *B26D 2007/0018* (2013.01); *B26D 2210/02* (2013.01)

(58) Field of Classification Search
CPC ............... A47J 43/0722; A47J 43/0705; A47J 43/0711; B26D 1/28; B26D 1/29; B26D 1/12; B26D 1/14; B26D 1/143; B26D 1/147; B26D 1/15; B26D 1/153; B26D 3/18; B26D 3/22; B26D 3/225; B26D 3/26; B26D 3/10; B26D 3/11; B26D 7/0641; B26D 7/2628; B26D 2210/02; B26D 7/18; B26D 7/1818; B26D 2007/1809; Y10S 83/932

USPC ............... 83/932; 241/100, 92, 277, 278.1; 99/537, 538

See application file for complete search history.

(56) References Cited

U.S. PATENT DOCUMENTS

| | | |
|---|---|---|
| 4,277,995 A | 7/1981 | Sontheimer |
| 5,913,484 A | 6/1999 | Kurtz |
| 8,635,948 B2 | 1/2014 | Herren |
| 9,332,879 B1* | 5/2016 | Bronson ............... A61M 15/06 |
| 2001/0008258 A1 | 7/2001 | Robordosa |
| 2005/0223864 A1* | 10/2005 | Hemelrijk ............... B26D 3/22 |
| | | 83/592 |
| 2007/0204467 A1* | 9/2007 | Livie ............... B26D 3/22 |
| | | 30/124 |
| 2009/0090254 A1 | 4/2009 | Herren |
| 2010/0005977 A1 | 1/2010 | Menashes |
| 2010/0154660 A1 | 6/2010 | Beber |

FOREIGN PATENT DOCUMENTS

| | | |
|---|---|---|
| EP | 2628424 A1 | 8/2013 |
| WO | 2007046029 A1 | 4/2007 |
| WO | 2013144941 A1 | 10/2013 |

* cited by examiner

DEVICE FOR CUTTING FOOD

This application is the U.S. National Phase application under 35 U.S.C. § 371 of International Application No. PCT/EP2015/072722, filed on Oct. 1, 2015, which claims the benefit of International Application No. 14190485.4 filed on Oct. 27, 2014. These applications are hereby incorporated by reference herein.

FIELD OF THE INVENTION

The invention relates to a device for cutting food, comprising a cutting unit having a rotatable carrier, a slicing knife associated with the carrier for slicing the food, and at least one dicing knife associated with the carrier for dicing the food.

BACKGROUND OF THE INVENTION

A device for cutting food generally comprises a cutting unit having at least one rotatable carrier supporting one or more knives attached thereto, a feeding tube arranged above the cutting unit for supplying food to be cut to the cutting unit, and a bowl arranged underneath the cutting unit for receiving the cut food from the cutting unit. Examples of such a device are known from EP 2 628 424 A1 and US 2010/0154660 A1. Examples of food to be cut include many types of vegetables and fruits, which may be relatively hard like onions or relatively soft like tomatoes.

U.S. Pat. No. 4,076,180 relates to a threading and dicing machine which comprises a cutting unit arranged in a housing. The cutting unit has a control disk mounted to a motor-driven shaft and a cutting blade mounted on the shaft above the control disk to slice food pieces. Furthermore, a set of thin vertical cutting blades can be mounted to the shaft through the control disk to produce shredded pieces of the food pieces. The control disk can be raised and lowered, and spacings between the thin vertical blades can be narrowed or widened, so that sizes of the slices or shreds can be increased and decreased.

A disadvantage of the machine known from U.S. Pat. No. 4,076,180 is that a flow of food pieces cannot be accurately controlled. Food which is supplied to the cutting unit descends under the influence of gravity and is supposed to encounter the vertical cutting blades and the cutting blade positioned above the control disk, but there is room for deviation from the route as desired. Furthermore, the food pieces are supposed to be driven towards a discharge opening providing access to a bowl or the like under the influence of rapid rotation of the control disk, for example, at 1200 rpm. Hence, the discharge of the food pieces is also not very well controlled, wherein there is a considerable risk that food pieces stay behind in the housing in which the cutting unit is present, and wherein it may happen that the food pieces are subjected to cutting processes during a prolonged period, resulting in a mushy mass of the food instead of well-cut dices. All in all, the known machine is not very effective in cutting food, while it is necessary to drive the cutting unit at a rather high speed and apply rather high forces for rotating all elements of the cutting unit, on the basis of which it is only possible to have a motor-driven version of the machine.

SUMMARY OF THE INVENTION

It is an object of the invention to provide a device for cutting food which has a robust structure, which is suitable for slicing and dicing food in a well-controlled, accurate and reproducible manner, and which offers a practical possibility of having a relatively low rotation speed of the elements of the cutting unit, so that a manually driven version of the device is conceivable if so desired.

According to the invention, a device for cutting food is provided, comprising a cutting unit having a rotatable carrier, a slicing knife associated with the carrier for slicing the food, and at least one dicing knife associated with the carrier for dicing the food, wherein the cutting unit furthermore comprises a protection element which is designed to be arranged vis-à-vis a side of the carrier where the dicing knife associated with the carrier is present, for delimiting a dicing space for the dicing knife associated with the carrier to move through during operation, and wherein the protection element is equipped with at least one annular groove at a side for facing the carrier, for receiving a free end of the dicing knife associated with the carrier.

In the device for cutting food according to the invention, a protection element is provided besides the carrier, which is designed to be arranged vis-à-vis a side of the carrier where the dicing knife associated with the carrier is present, and which has a function in delimiting a dicing space for the dicing knife associated with the carrier to move through. Hence, by applying the protection element, a well-defined dicing space is created, which contributes to the effectiveness of the dicing process taking place in the device during operation of the device. In order to have a configuration in which the dicing knife associated with the carrier is allowed to extend into the protection element, thereby bridging the distance between the carrier and the protection element, and in which the protection element can have a closed appearance in order to fulfill the function of delimiting the dicing space, at least in a major part of the side of the protection element for facing the carrier, the protection element is equipped with at least one annular groove at the side as mentioned, for receiving a free end of the dicing knife associated with the carrier.

It follows from the foregoing explanation of the basic features of the device for cutting food according to the invention that by applying the carrier and the protection element as defined, it is achieved that the dicing process takes place in a well-defined dicing space, wherein it is ensured that the at least one dicing knife associated with the carrier extends all the way through the dicing space, i.e. from the carrier into the protection element, as a result of which effectiveness of the dicing process is optimized. The at least one groove of the protection element serves for receiving a free end of the at least one dicing knife associated with the carrier, and the groove has an annular shape in order to allow for rotation of the carrier and the protection element with respect to each other while allowing for unhindered movement of the free end of the dicing knife and maintaining the coverage of the distance between the carrier and the protection element by the dicing knife at the same time.

By choosing an appropriate height of the slicing knife with respect to the carrier, a desired thickness of a slice of food can be realized, and by choosing an appropriate number of dicing knives and appropriate positioning of the dicing knives, other dimensions of dices of the food besides the thickness (=height of the dices) can be realized as prescribed in a certain case. In other words, the appearance of the dices of food to be obtained by means of the device according to the invention can be accurately controlled. Furthermore, on the basis of the fact that the effectiveness of the dicing process is optimal, it is not necessary to rotate the carrier and the protection element at a very high speed with respect to each other, so that it is possible to have a manually driven version of the device if so desired.

Preferably, the carrier is axially movable with respect to the slicing knife associated with the carrier and/or the protection element in order to vary the height of the slicing knife with respect to the carrier and/or the distance between the carrier and the protection element. In that way, it is possible to adjust the thickness of the slices of food to be made into dices according to desire. By choosing an appropriate depth of the groove of the protection element, it is possible to avoid a situation in which an axial displacement of the carrier would automatically need to involve an axial displacement of the protection element in order to avoid the end of the dicing knife associated with the carrier to retract from the protection element or to abut against the protection element. Hence, on the basis of the application of the groove in the protection element, it is possible to have an embodiment of the device for cutting food in which the height of the slices of food to be cut can be adapted while avoiding a need for a complex construction of the device involving a lot of movable components. In particular, it is possible to have an embodiment in which of the carrier, the slicing knife associated with the carrier, and the protection element, only the carrier is axially movable, so that an increase of the height of the slicing knife with respect to the carrier involves a decrease of the distance between the carrier and the protection element, and vice versa. Such embodiment can function well if it is ensured that the minimum of the distance between the carrier and the protection element is at least as large as the maximum of the height of the slicing knife with respect to the carrier.

In a practical embodiment of the device according to the invention, the dicing knife associated with the carrier projects from the carrier along a distance which is larger than the depth of the groove of the protection element. In that case, it is always possible to have a configuration in which the dicing knife is capable of bridging the distance between the carrier and the protection element and extending partially into the groove of the protection element at the same time, so that there is no ineffective space between the carrier and the protection element in which food could escape from the dicing process, and the effectiveness of the dicing process can be maintained at an optimal level for all possible mutual axial positions of the carrier, the slicing knife associated with the carrier, the dicing knife associated with the carrier, and the protection element.

Advantageously, the protection element is provided with an opening for allowing cut food to pass through the protection element. For example, the protection element may generally be shaped like a basket, wherein an opening may be arranged in the bottom of the basket. In such case, an effective dicing process is obtained when food slices to be subjected to the dicing process are made to move between the carrier and the bottom of the protection element first, i.e. during a first stage of a rotation of the carrier, and exit the dicing space through the opening at a final stage of a rotation of the carrier. Once the sliced and diced food has fallen down through the opening in the protection element, that food is shielded from further cutting by the closed portion of the bottom of the protection element.

In general, both the carrier and the protection element may be shaped like disks which are designed to be put in a coaxial arrangement with respect to each other. The dicing space is present between sides of the disks facing each other in such case. In view of the fact that at least the carrier is rotatably arranged in the food cutting device, it is practical for the disks to have a circular periphery.

It is a practical possibility for the protection element to be designed for a fixed arrangement in the food cutting device. In such case, only the carrier needs to be driven, so that it suffices to take minimal measures for realizing a relative movement of the carrier and the protection element, and so that it is very well possible to have a manually driven version of the device.

According to a feasible option, the slicing knife is arranged at another side of the carrier than the dicing knife. In such case, only the dicing knife is present in the dicing space between the carrier and the protection element. Hence, in such case, it is possible to have separate slicing and dicing processes, so that the design of the food cutting device can easily be optimized for both processes without a need for a compromise.

In a practical embodiment of the device according to the invention, a plurality of dicing knives are associated with the carrier, wherein those dicing knives are arranged in a number of rows having a radial orientation with respect to an axis of rotation of the carrier. By using a plurality of dicing knives, and arranging the dicing knives in radially oriented rows on the carrier, it is achieved that a food slice can be cut into dices of prescribed size in just a single rotation of the carrier, assuming that the protection element is fixedly arranged.

Furthermore, in a practical embodiment of the device according to the invention, the device comprises a feeding tube for supplying food to be cut to the carrier, wherein a distance between the slicing knife and the dicing knife associated with the carrier, behind the slicing knife in a direction of rotation of the carrier, is at least as large as a diameter of the feeding tube at the side of the carrier. In that way, assuming that the slicing process of the food takes place prior to the dicing process, it is possible for an entire food slice to enter the dicing space before encountering the dicing knife.

Advantageously, the carrier comprises at least one projection at the side where the dicing knife associated with the carrier is present, at a position for being opposite to the groove of the protection element. Such projection may be used for displacing food dices without performing a cutting action on the food dices. Hence, it is practical for the projection to be blunt at a side which is a front side in the direction of rotation of the carrier. Also, it is practical if an area which is an area behind the projection as seen in the direction of rotation of the carrier, and which extends to the position of the slicing knife, is free from any dicing knife. The projection may be arranged such as to be capable of moving the food dices towards an opening for exiting the dicing space during rotation of the carrier.

In a practical embodiment of the device according to the invention, especially an embodiment in which a plurality of dicing knives are associated with the carrier and in which the protection element is equipped with a plurality of grooves for receiving a free end of those dicing knives, the carrier comprises a plurality of projections as mentioned, wherein those projections may be arranged in a single row having a radial orientation with respect to the axis of rotation of the carrier. In such case, it is possible to displace all food dices present in the dicing space, as the entire radius of the dicing space is covered by the projections.

In a preferred embodiment of the device according to the invention, at least one dicing knife is associated with the protection element for dicing the food at the side of the protection element for facing the carrier. In other words, it is possible for the device to comprise both at least one dicing knife which is associated with the carrier and at least one dicing knife which is associated with the protection element. In that way, effectiveness of the dicing process is even further enhanced, as during the mutual rotation of the carrier and the protection element, the dicing knives associated with the carrier and the protection element, respectively, are moved towards each other during a stage of the rotation. In order to avoid collision of the knives, the knives are arranged at mutually offset positions.

As mentioned in respect of the dicing knife associated with the carrier, a plurality of dicing knives may be associated with the protection element, wherein those dicing knives may be arranged in a number of rows having a radial orientation with respect to an axis of rotation of the carrier. Furthermore, it is noted that the possibility of having at least one projection projecting from the carrier into the dicing space is also applicable to the embodiment in which at least one dicing knife is associated with the carrier and at least one dicing knife is associated with the protection element.

It is practical for the dicing knife associated with the protection element to extend from the top of the groove of the protection element. In that way, it is achieved that an area above the bottom of the groove is available for receiving an end of the dicing knife associated with the carrier. Furthermore, in order to have a configuration in which it is possible for the dicing knife associated with the protection element to bridge the dicing space and extend into the carrier, and in which it is also possible to have an adjustment of the height of the dicing space, it is practical for the carrier to be equipped with at least one annular groove at the side where the dicing knife associated with the carrier is present, for receiving a free end of the dicing knife associated with the protection element. In such case, the dicing knife associated with the carrier may be arranged such as to extend from the top of the groove of the carrier.

In a case in which a plurality of dicing knives are associated with the carrier, and in which a plurality of dicing knives are associated with the protection element, the carrier may be equipped with a plurality of grooves and the protection element may also be equipped with a plurality of grooves, in such a way that the pattern of the grooves of the carrier is complementary with the pattern of the grooves of the protection element in order to have the offset arrangement of the respective knives as mentioned earlier, assuming that both the knives of the carrier and the knives of the protection element extend from the tops of the respective grooves.

The above-described and other aspects of the invention will be apparent from and elucidated with reference to the following detailed description of an embodiment of a food cutting device according to the invention.

BRIEF DESCRIPTION OF THE DRAWINGS

The invention will now be explained in greater detail with reference to the figures, in which equal or similar parts are indicated by the same reference signs, and in which.

DETAILED DESCRIPTION OF EMBODIMENTS

Figure 1:
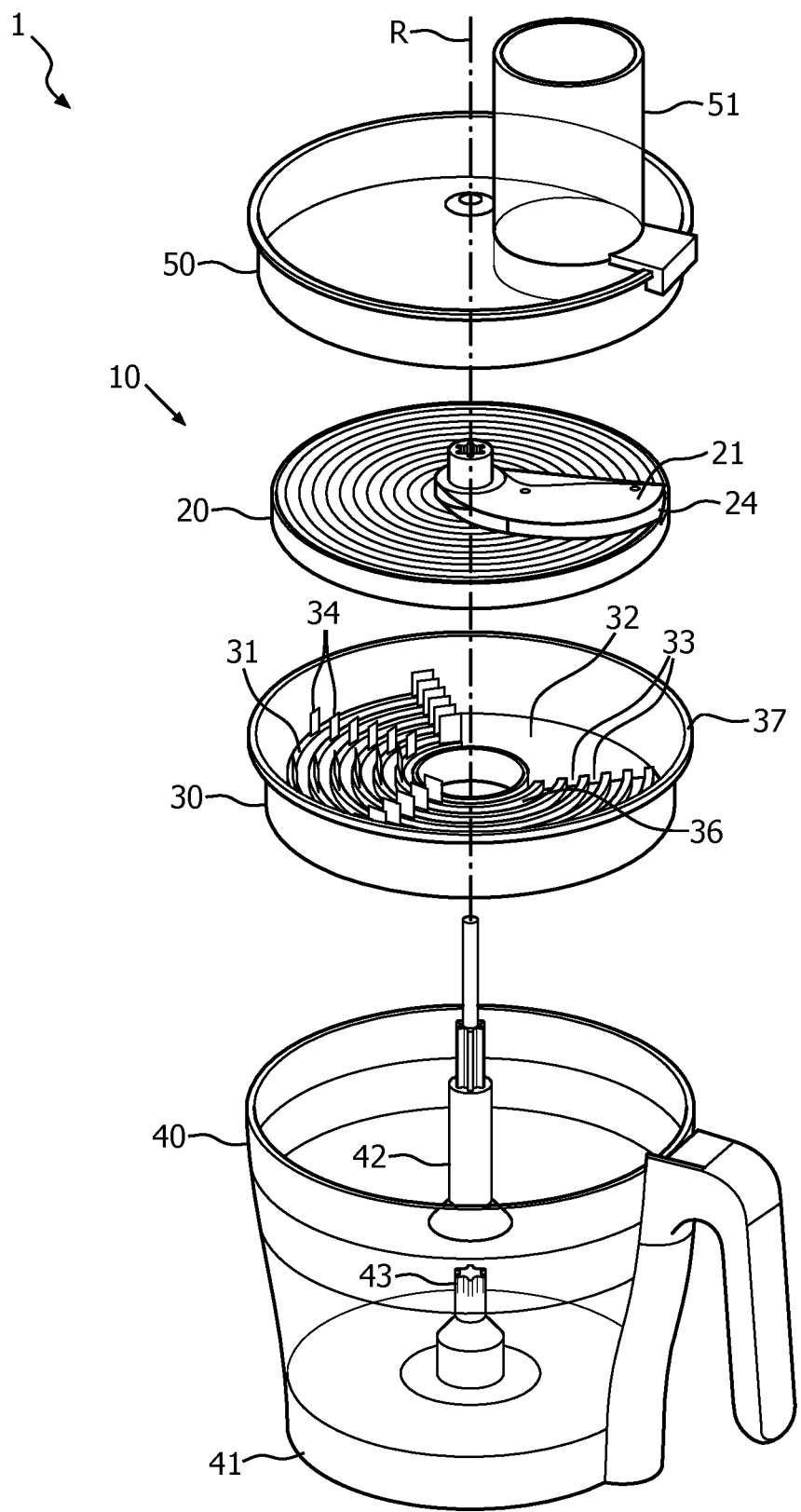
FIG. 1 shows an exploded view of the various components of an embodiment of a food cutting device according to the invention, particularly a bowl, a protection element, a carrier and a lid.
Figure 2:
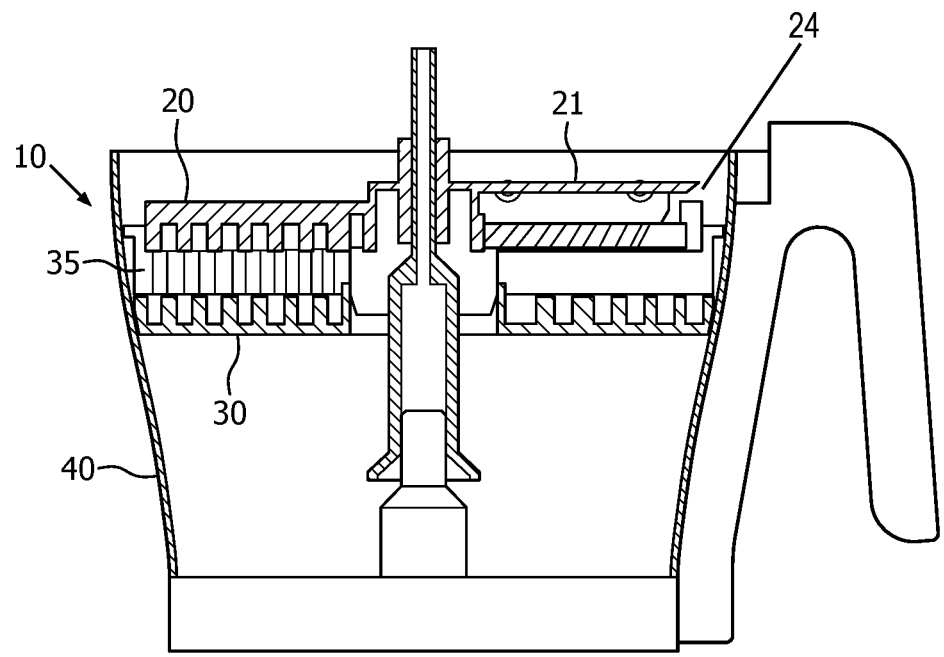
FIG. 2 shows a sectional view of the food cutting device with the bowl, the protection element and the carrier in an assembled state.

FIG. 1 shows the various components of an embodiment of a food cutting device 1 according to the invention, in a disassembled state. Furthermore, FIG. 1 illustrates an assembly order of the components, while FIG. 2 shows a number of the components in an assembled state. In general, the food cutting device 1 is adapted to perform a cutting action on food to be supplied to the device 1. For the sake of clarity, the possibility to use the device 1 for processing an onion is herewith mentioned as an example of the many possibilities existing within the scope of the invention. The device 1 according to the invention is particularly adapted to output dices of the food to be processed, but can also be used to output slices of the food as will be described later.

The food cutting device 1 may be a manually driven device or a motor-driven device. For the sake of clarity, it is assumed that the device 1 comprises a motor for driving the rotatably arranged components of the device 1 in the following. A version of the device 1 which is suitable to be manually driven by a user is equipped with a handle, a knob or the like, at an appropriate position for allowing the user to take hold of the handle, the knob or the like and cause the relevant components of the device 1 to rotate by exerting force on the handle, the knob or the like.

The food cutting device 1 comprises four basic components, namely a carrier 20, a protection element 30, a bowl 40 and a lid 50. The carrier 20 and the protection element 30 make up a cutting unit 10 of the device 1, i.e. a unit 10 where the actual cutting actions take place during operation of the device 1. The carrier 20 is generally disk-shaped, whereas the protection element 30 is shaped like a basket, wherein both the carrier 20 and the protection element 30 have a circular periphery. FIGS. 1 and 2 show the components of the device 1 in a normal orientation, and FIG. 2 shows the components of the device 1 except for the lid 50 in an operative mutual positioning, wherein the bottom of the device 1 is constituted by the bottom 41 of the bowl 40, wherein the lid 50 is placed on top of the bowl 40, and wherein the cutting unit 10 is present at a top position in the bowl 40, with the carrier 20 at a higher level and the protection element 30 at a lower level. The carrier 20 is supported on a driving spindle 42, and the driving spindle 42 is supported on a driving axle 43 which is present at the bottom 41 of the bowl 40, and which is coupled to the output shaft of the motor. During operation of the device 1, the motor is activated such as to drive the carrier 20 through the driving axle 43 and the driving spindle 42, as a result of which the carrier 20 is rotated about an axis of rotation R which coincides with a central axis of the carrier 20 in the shown example.

Figure 3:
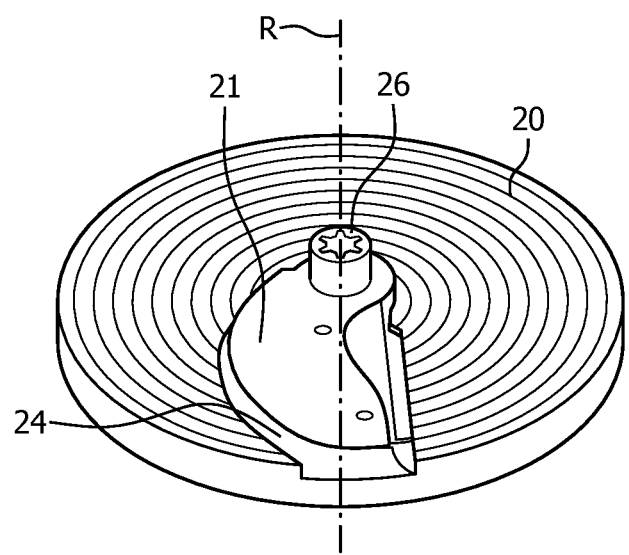
FIGS. 3, 4 and 5 show different views of the carrier.
Figure 4:
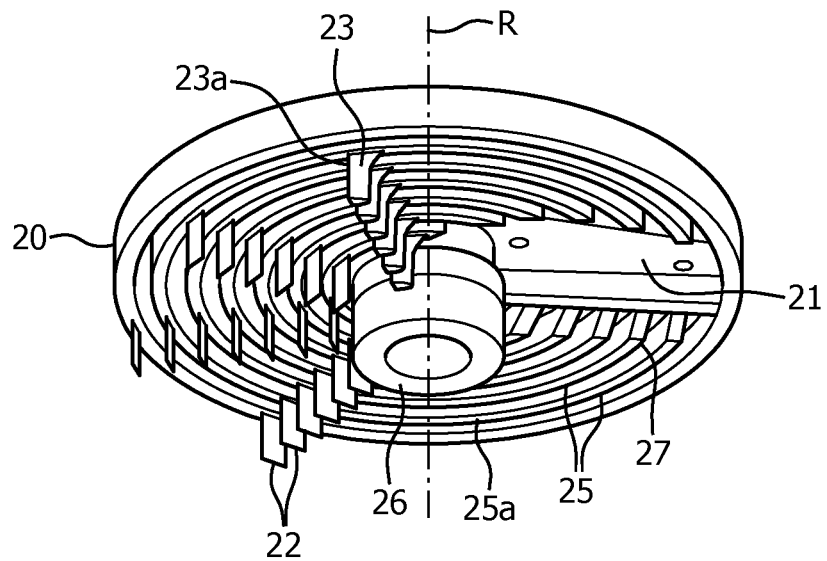
Figure 5:
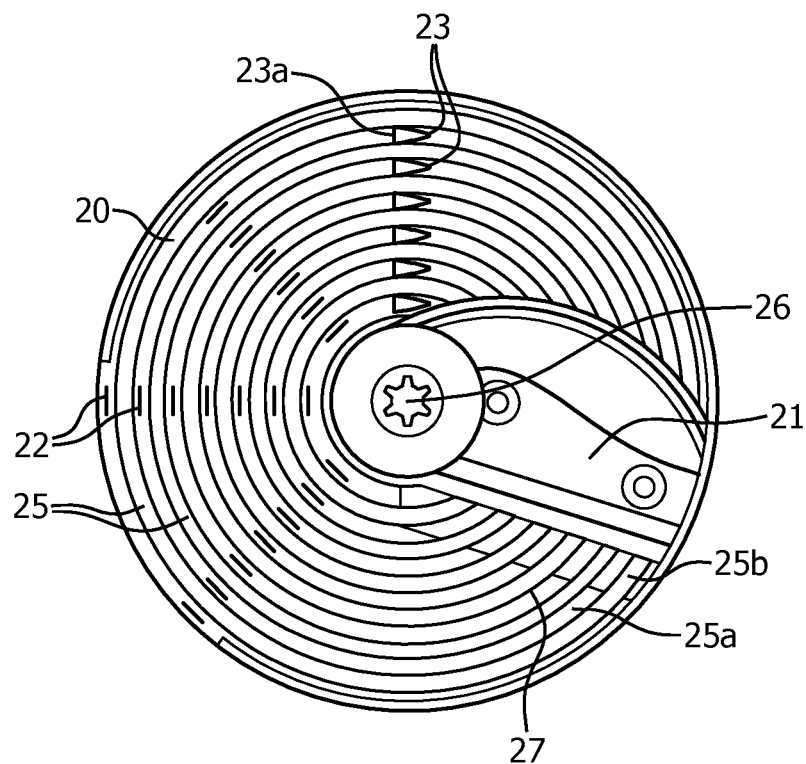

The carrier 20 is shown in more detail in FIGS. 3, 4 and 5. At one side of the carrier 20, a slicing knife 21 is present, whereas at another side, which is the side for facing the protection element 30, a plurality of dicing knives 22 are present. For the sake of clarity, the first side will be referred to as the top side, and the second side will be referred to as the bottom side. At the bottom side, besides the dicing knives 22, projections 23 are present. In the shown example, the dicing knives 22 are arranged on the carrier 20 in three radially oriented rows, and the projections 23 are arranged on the carrier 20 in a single radially oriented row. At the position of the slicing knife 21, an opening 24 is arranged in the carrier 20. Furthermore, at the bottom side, a number of concentric grooves 25 are arranged in the carrier 20. Both the dicing knives 22 and the projections 23 extend in a downward direction from tops 25a of the grooves 25. A coupling member 26 is arranged in the carrier 20 at a central position for coupling the carrier 20 including the slicing knife 21 to the driving spindle 42.

Figure 6:
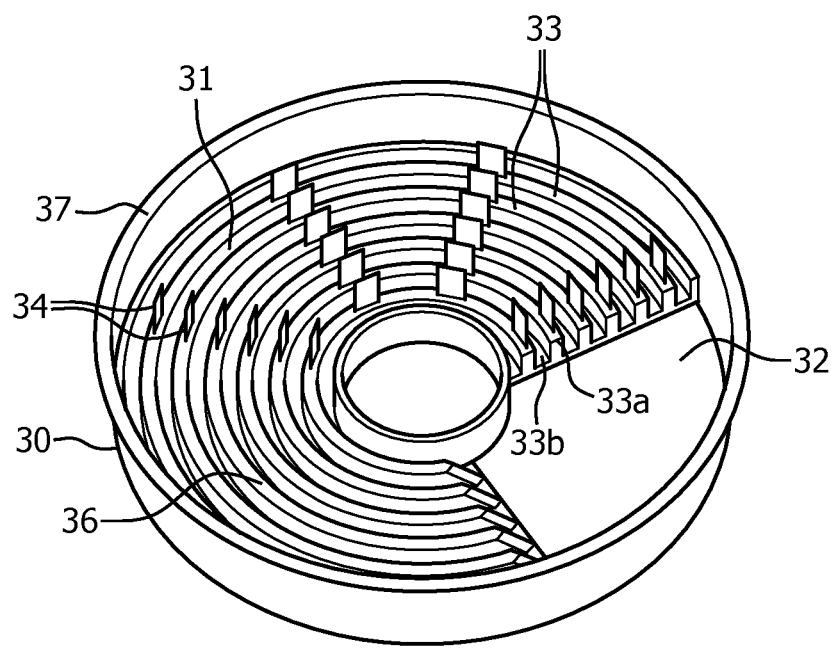
FIGS. 6 and 7 show different views of the protection element.
Figure 7:
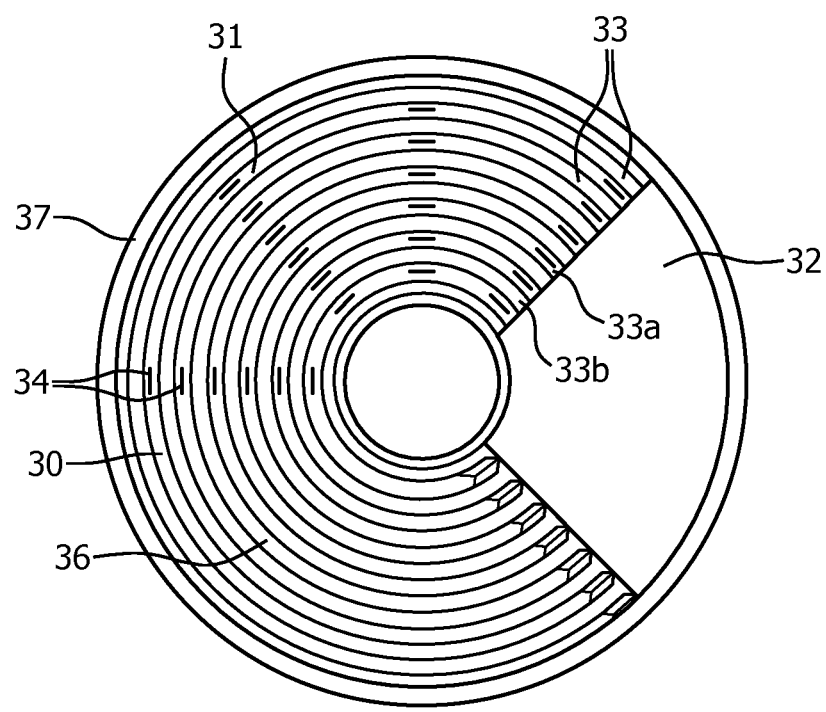

The protection element 30 is shown in more detail in FIGS. 6 and 7. As mentioned in the foregoing, the protection element 30 is generally shaped like a basket. In the bottom 31 of the basket, an opening 32 is arranged. However, in other embodiments, the opening 32 of the protection element 30 can also be arranged at the side surface, i.e. in the standing wall extending from the bottom 31. At a side of the bottom 31 for facing the carrier 20, which will hereinafter be referred to as top side, a number of concentric grooves 33 are present in the protection element 30, in a pattern which is complementary to the pattern of the grooves 25 in the carrier 20, which means that tops 33a of the grooves 33 of the protection element 30 are opposite to bottoms 25b of the grooves 25 of the carrier 20, and that bottoms 33b of the grooves 33 of the protection element 30 are opposite to tops 25a of the grooves 25 of the carrier 20 when the carrier 20 and the protection element 30 are in place in the bowl 40, as can be seen in the sectional view of FIG. 2. Furthermore, the protection element 30 is equipped with a plurality of dicing knives 34 extending in an upward direction from the top side of the bottom 31, particularly from the tops 33a of the grooves 33. In the shown example, the dicing knives 34 are arranged on the protection element 30 in four radially oriented rows.

FIG. 2 shows that in the assembled state of the cutting unit 10, a space 35 is present between the carrier 20 and the protection element 30, particularly between an utmost bottom side of the carrier 20 defined by the tops 25a of the grooves 25 of the carrier 20 and an utmost top side of the protection element 30 defined by the tops 33a of the grooves 33 of the protection element 30. The dicing knives 22, 34 of both the carrier 20 and the protection element 30 extend through the space 35 as mentioned, which will therefore hereinafter be referred to as dicing space 35, at radially alternating positions. In particular, the dicing knives 22 of the carrier 20 are long enough to extend all the way down from the tops 25a of the grooves 25 of the carrier 20 into the grooves 33 of the protection element 30, and the dicing knives 34 of the protection element 30 are long enough to extend all the way up from the tops 33a of the grooves 33 of the protection element 30 into the grooves 25 of the carrier 20.

Figure 8:
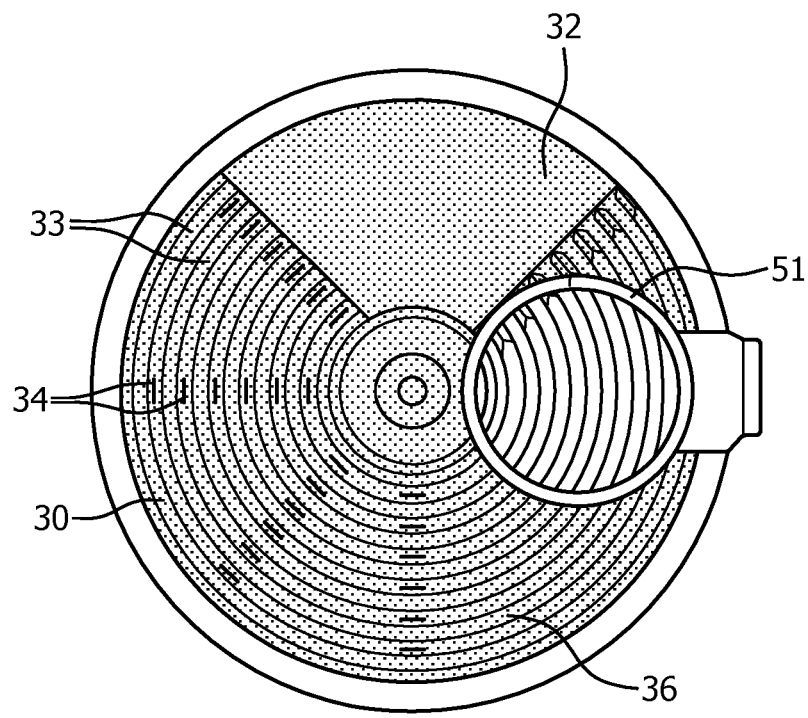
FIGS. 8 and 9 illustrate the positioning of the protection element and the carrier, respectively, with respect to a feeding tube of the lid.
Figure 9:
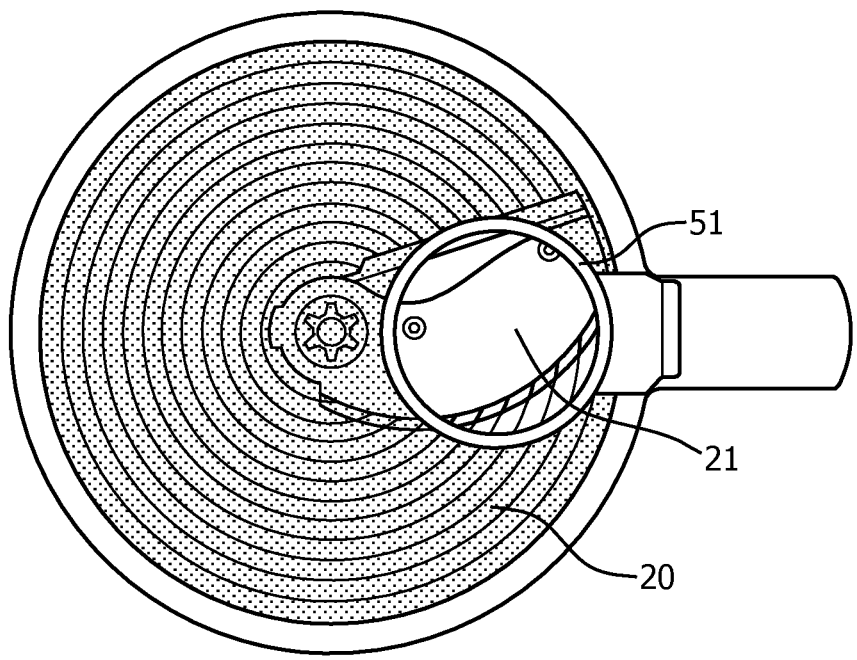

Food to be cut by means of the food cutting device 1 is fed by a user to the cutting unit 10 through a feeding tube 51 which is part of the lid 50. FIGS. 8 and 9 illustrate the fact that in a correct positioning of the carrier 20 and the protection element 30 in the enclosure formed by the bowl 40 and the lid 50, the feeding tube 51 is above the slicing knife 21 and the underlying opening 24 in the carrier 20, and above an area 36 of the bottom 31 of the protection element 30 which is present just outside the opening 32 in the bottom 31, and which is free from dicing knives 34.

Figure 10:
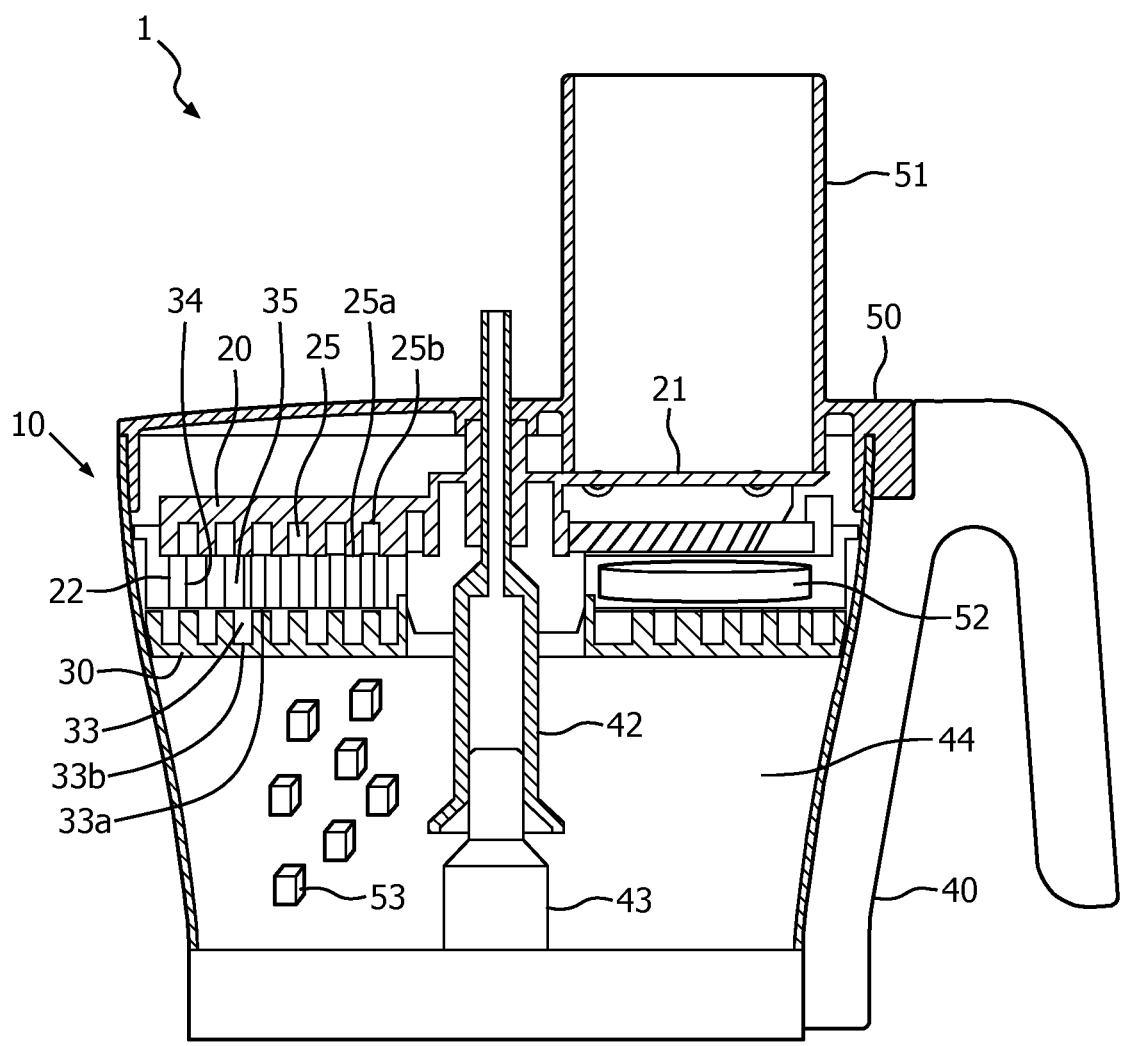
FIG. 10 shows a sectional view of the food cutting device with the components in an assembled state, and illustrates how food slices and food dices are obtained when food is supplied to the device and the device is operated.

FIG. 10 illustrates how food slices 52 and food dices 53 are obtained when food is supplied to the food cutting device 1 and the device 1 is operated. The axial position of the carrier 20, i.e. the level of the carrier 20 in the bowl 40 is adjustable, so that it is possible for a user of the device 1 to adapt the height of the slicing knife 21 with respect to the top side of the carrier 20 and thereby the thickness of the food slices 52 and the height of the food dices 53. The axially adjustable position of the carrier 20 may be realized in any suitable way, for example, a way known per se from WO 02/30253 A1. In general, when the carrier 20 is moved in a downward direction along the driving spindle 42, the height of the slicing knife 21 with respect to the top side of the carrier 20 increases, while the height of the dicing space 35 decreases, wherein the dicing knives 22 of the carrier 20 extend further into the grooves 33 of the protection element 30, and wherein the dicing knives 34 of the protection element 30 extend further into the grooves 25 of the carrier 20. Contrariwise, when the carrier 20 is moved in an upward direction along the driving spindle 42, the height of the slicing knife 21 with respect to the top side of the carrier 20 decreases, while the height of the dicing space 35 increases, wherein the dicing knives 22 of the carrier 20 extend to a lesser extent into the grooves 33 of the protection element 30, and wherein the dicing knives 34 of the protection element 30 extend to a lesser extent into the grooves 25 of the carrier 20. For example, in view of an application of the food cutting device 1 as mentioned in the foregoing, namely for cutting an onion, the minimum height of the slicing knife 21 with respect to the top side of the carrier 20 is 1.5 mm, while the maximum height of the slicing knife 21 with respect to the top side of the carrier 20 is 12 mm. Advantageously, the depth of the grooves 25, 33 of the carrier 20 and the protection element 30 is related to the minimum and maximum as mentioned in such a way that the depth is at least the difference between the minimum and the maximum. An example of the height of the dicing knives 22, 34 of both the carrier 20 and the protection element 30 is 14 mm.

When considering a rotation of the carrier 20, the following aspects of the design of the carrier 20 are relevant. In the first place, due to the rotary movement of the carrier 20 including the slicing knife 21 with respect to the feeding tube 51 of the lid 50, a slice 52 is cut from a bottom side of the food as present in the feeding tube 51 by the slicing knife 21. Under the influence of gravity, the food slice 52 falls through the opening 24 of the carrier 20 and is further processed at the bottom side of the carrier 20. An area 27 at the bottom side of the carrier 20, which is positioned behind the slicing knife 21 as seen in the direction of rotation of the carrier 20, is at least as large as the diameter of the feeding tube 51, in order to be capable of receiving a food slice 52 in its entirety. As the rotary movement of the carrier 20 is continued, the food slice 52 is encountered and cut by the successive rows of dicing knives 22 of the carrier 20.

Figure 11:
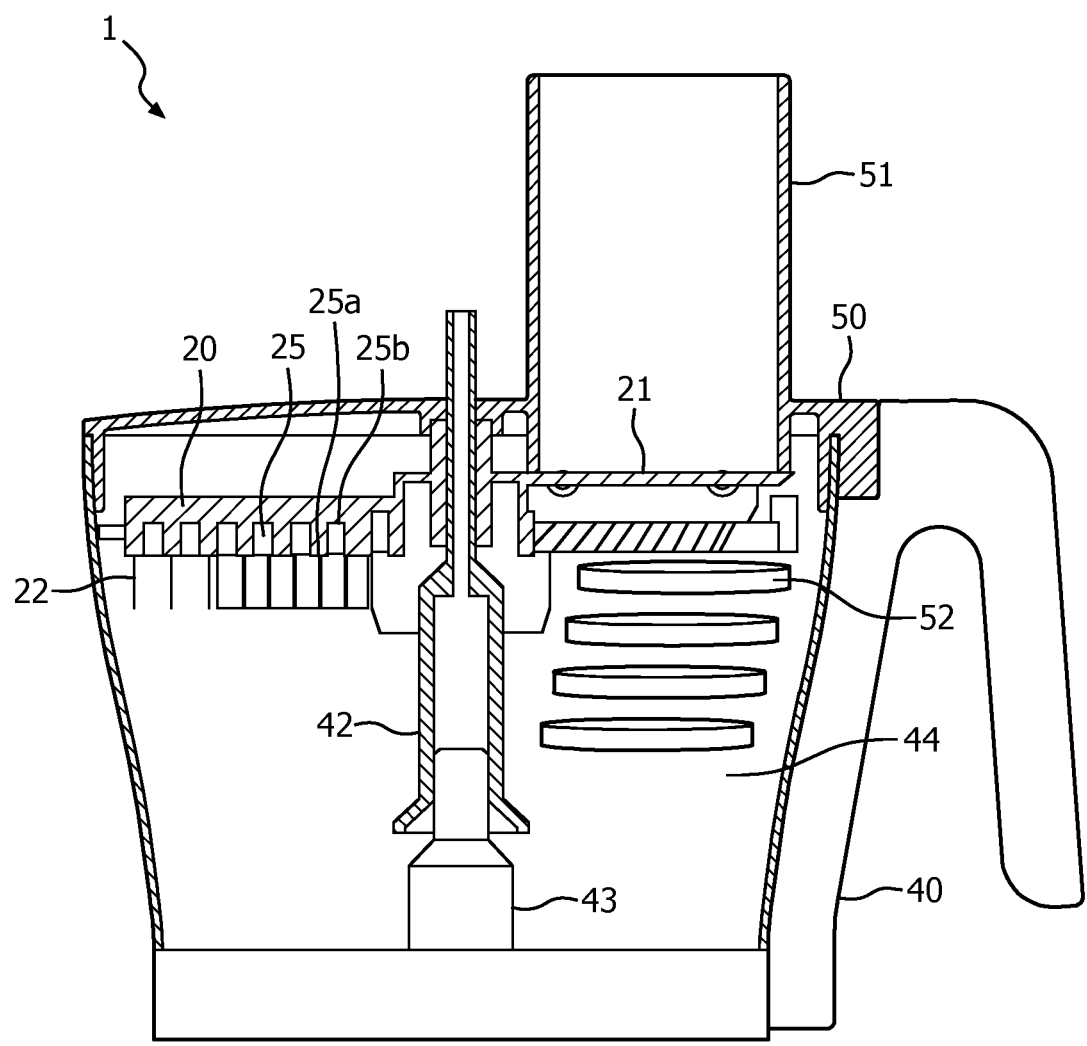
FIG. 11 shows a sectional view of the food cutting device with the bowl, the carrier and the lid in an assembled state, and illustrates how only food slices are obtained when food is supplied to the device and the device is operated without the protection element.

It is possible for the food cutting device 1 to be applied without the protection element 30, as illustrated in FIG. 11. In such case, the device 1 is only capable of performing a slicing action on the food. As soon as a food slice 52 has been cut from the food, the food slice 52 falls down through the opening 24 of the carrier 20, and is received in a bottom part 44 of the bowl 40. The dicing function of the carrier 20 as described in the foregoing is only performed when the protection element 30 is present at the position vis-à-vis the bottom side of the carrier 20. Only in such case, food slices 52 are subjected to further cutting actions, until they are capable of escaping from the dicing space 35 through the opening 32 in the bottom 31 of the protection element 30, after which they are protected from further cutting.

When the protection element 30 is applied in the food cutting device 1, the row of projections 23 has a function in moving food dices 53 towards the opening 32 in the bottom 31 of the protection element 30 and cleaning the dicing space 35 before the next rotation of the carrier 20 takes place and a new food slice 52 is supplied to the dicing space 35. To that end, the projections 23 are blunt at the side 23a which is their front side in the direction of rotation of the carrier 20.

Before the food dices 53 are transported towards the opening 32 in the bottom 31 of the protection element 30 and fall down into the bottom part 44 of the bowl 40, the food slice 52 which is supplied to the dicing space 35 is diced by means of the dicing knives 22 of the carrier 20 as described in the foregoing, and also the dicing knives 34 of the protection element 30. In the process, the dicing knives 22 of the carrier 20 move between the dicing knives 34 of the protection element 30, as a result of which the effectiveness of the dicing process is enhanced. For the sake of completeness, it is noted that the size of the dices 53 may be chosen according to desire by having a number of combinations of a carrier 20 and a protection element 30 with the food cutting device 1, wherein a distance between successive dicing knives 22, 34 in a row is different for different combinations. The dicing process does necessarily require the application of more than one row of dicing knives 22, 34 on the carrier 20 and the protection element 30. The fact is, however, that by having a number of rows, the effectiveness of the dicing process is enhanced, such that it may be ensured that the dicing process is completed in one rotation of the carrier 20.

In order to have a reliable fixation of the protection element 30 in the food cutting device 1, the rim 37 of the protection element 30 may be designed in a special way such as to be capable of engaging with the bowl 40 at an interior surface of the bowl 40 in any manner known per se. The design of the rim 37 is advantageously also adapted to ensure that the protection element 30 is positioned in the correct manner with respect to the feeding tube 51 of the lid 50 when the protection element 30 is fixed in place in the bowl 40 and the lid 50 is present on the bowl 40 in a prescribed manner, wherein a connection between the bowl 40 and the lid 50 may also be of such nature that the angular position of the lid 50 with respect to the bowl 40 is reproducible.

On the basis of the features of the cutting unit 10 comprising the carrier 20 and the protection element 30 as described in the foregoing, it suffices to have a relatively low speed of the carrier 20, for example, a speed in range of 200 to 1,000 rpm. As each of the food slices 52 is made into food dices 53 in only one rotation of the carrier 20, excessive exposure of the food to the dicing knives 22, 34 is prevented, so that it does not happen that the food turns into a fine and mushy mass. Instead, the food dices 53 are made with a prescribed and reproducible size, especially when the dicing knives 22, 34 are arranged in a number of rows on the carrier 20 and the protection element 30, respectively, as is the case in the shown example.

It will be clear to a person skilled in the art that the scope of the invention is not limited to the examples discussed in the foregoing, but that several amendments and modifications thereof are possible without deviating from the scope of the invention as defined in the attached claims. While the invention has been illustrated and described in detail in the figures and the description, such illustration and description are to be considered illustrative or exemplary only, and not restrictive. The invention is not limited to the disclosed embodiments.

Variations to the disclosed embodiments can be understood and effected by a person skilled in the art in practicing the claimed invention, from a study of the figures, the description and the attached claims. In the claims, the word "comprising" does not exclude other steps or elements, and the indefinite article "a" or "an" does not exclude a plurality. The mere fact that certain measures are recited in mutually different dependent claims does not indicate that a combination of these measures cannot be used to advantage. Any reference signs in the claims should not be construed as limiting the scope of the invention.

The invention relates to a device 1 for cutting food as defined in the foregoing. Furthermore, the invention relates to a cutting unit 10 for use in a device 1 for cutting food, comprising a rotatable carrier 20, a slicing knife 21 associated with the carrier 20 for slicing the food, at least one dicing knife 22 associated with the carrier 20 for dicing the food, and a protection element 30 which is designed to be arranged vis-à-vis a side of the carrier 20 where the dicing knife 22 associated with the carrier 20 is present, for delimiting a dicing space 35 for the dicing knife 22 associated with the carrier 20 to move through during operation, wherein the protection element 30 is equipped with at least one annular groove 33 at a side for facing the carrier 20, for receiving a free end of the dicing knife 22 associated with the carrier 20. Also, the invention relates to a carrier 20 for use in the cutting unit 10 as mentioned, as well as to a protection element 30 for use in the cutting unit 10.

The device 1 according to the invention may be any type of device for cutting food, such as a top or bottom driven food processor, a chopper, or a cutting tower or the like to be combined with a bowl for filling the bowl with ingredients of a dish to be prepared in the bowl, for example, a salad, or a dish to be cooked in the bowl.

The invention claimed is:
1. A device for cutting food, comprising:
a cutting unit comprising a rotatable carrier;
a slicing knife disposed on a first side of the rotatable carrier; and
at least one dicing knife associated with the rotatable carrier disposed on a second side opposing the first side, the cutting unit further comprising a protection element, which is disposed along the second side of the rotatable carrier, the protection element for delimiting a dicing space for the at least one dicing knife associated with the rotatable carrier to move through during operation, wherein the protection element is equipped with at least one annular groove at a side for facing the rotatable carrier so that the protection element receives a free end of each of the at least one dicing knife associated with the rotatable carrier; and
projections disposed on the rotatable carrier in a single radially oriented row and configured to move food dices towards an opening in a bottom of the protection element, wherein the projections each have a blunt side at a front side, and the projections each have a tapered side at a back side.
2. The device according to claim 1, wherein the rotatable carrier is axially movable with respect to the protection element in order a distance between the rotatable carrier and the protection element.

3. The device according to claim 1, wherein the projections are disposed in positions opposing the at least one annular groove of the protection element.

4. The device according to claim 1, wherein each of the at least one dicing knife associated with the rotatable carrier projects from the rotatable carrier along a distance which is larger than a depth of a respective one of the at least one annular groove of the protection element.

5. The device according to claim 1, wherein the protection element is provided with the opening to allow for cut food to pass through the protection element.

6. The device according to claim 1, wherein the protection element is designed to be fixedly arranged in the device.

7. The device according to claim 1, wherein the at least one dicing knife comprises a plurality of dicing knives, the plurality of dicing knives are associated with the rotatable carrier, and wherein the plurality of dicing knives is arranged in a number of rows each having a radial orientation with respect to an axis of rotation of the rotatable carrier.

8. The device according to claim 1, wherein at least one second dicing knife is associated with the protection element for dicing the food at the side of the protection element for facing the rotatable carrier.

9. The device according to claim 8, wherein the at least one second dicing knife comprises a plurality of second dicing knives, and wherein the plurality of second dicing knives are arranged in a plurality of rows having respective radial orientations with respect to an axis of rotation (R) of the rotatable carrier.

10. The device according to claim 8, wherein the at least one second dicing knife associated with the protection element extends from a top of the at least one annular groove of the protection element.

11. The device according to claim 8, wherein the rotatable carrier is equipped with at least one other annular groove along the second side of the rotatable carrier for receiving a free end of the at least one second dicing knife associated with the protection element.

12. The device according to claim 11, wherein the at least one dicing knife associated with the rotatable carrier extends from a top of the at least one other annular groove of the rotatable carrier.

13. The device according to claim 11, wherein the rotatable carrier is equipped with a plurality of grooves including the at least one other annular groove, wherein the protection element is equipped with a plurality of grooves including the at least one annular groove, and wherein a pattern of the plurality of grooves of the rotatable carrier is complementary with a pattern of the plurality of grooves of the protection element.

* * * * *